Patented Oct. 13, 1936

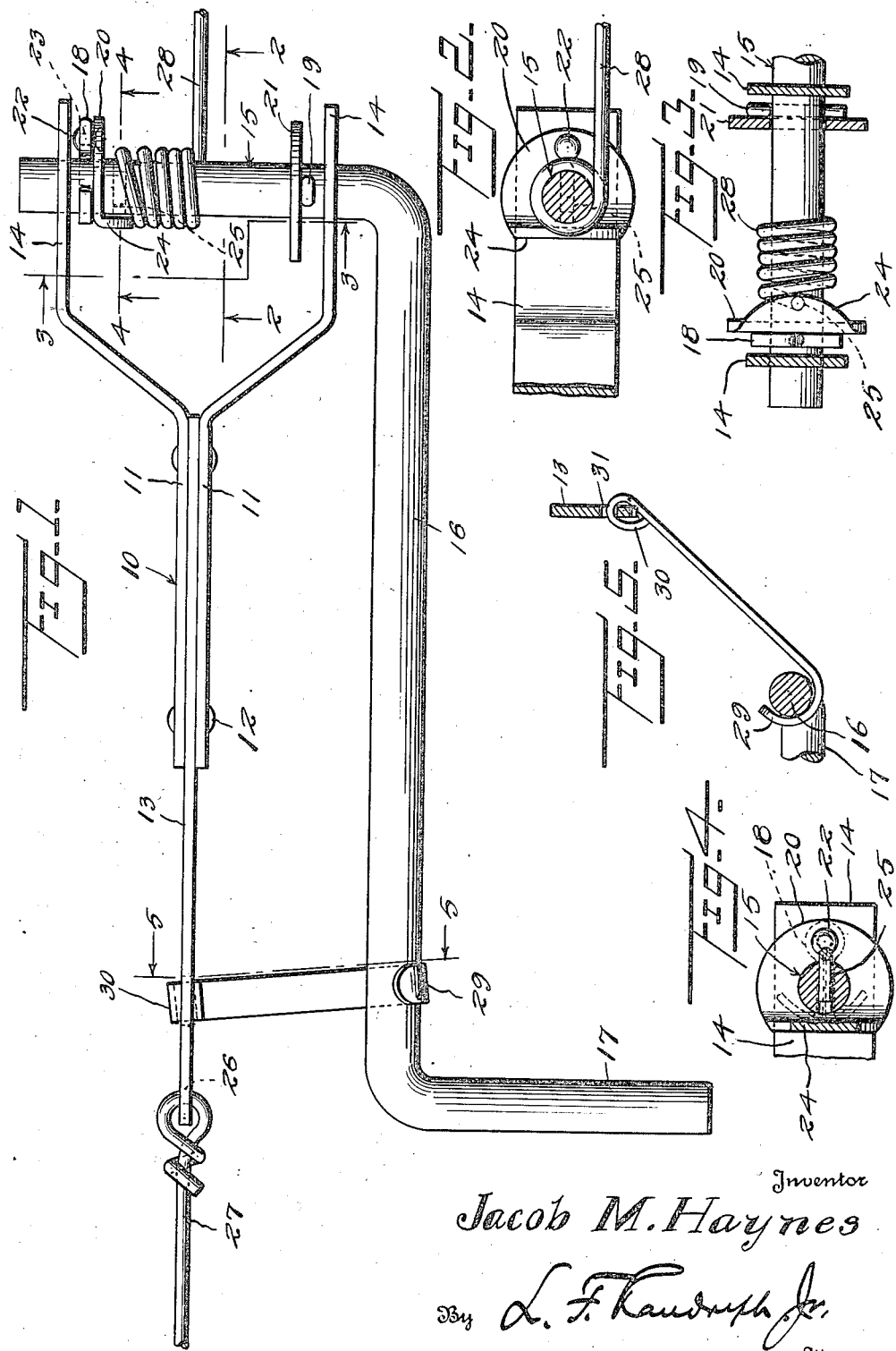

2,057,572

UNITED STATES PATENT OFFICE 2,057,572

CLOTHESLINE STRETCHER

Jacob M. Haynes, Macksville, Kans.

Application March 11, 1936, Serial No. 68,311

5 Claims. (Cl. 254—161)

This invention relates to a stretcher primarily adapted for use in connection with a clothesline.

It is generally aimed to provide a device of this kind which is simple, inexpensive, practical and efficient and capable of manufacture from a minimum number of parts.

It is particularly aimed to provide a structure wherein the reel is positioned by means utilizing a cotter or the equivalent to which a washer is fastened in apposition to a hole in the reel for receiving the end of the line or wire to be stretched, and which washer has a bent portion adapted to serve as a wire adjusting guide block.

The more specific objects and advantages will become apparent from a consideration of the description following taken in connection with the accompanying drawing illustrating an operative embodiment.

In said drawing:—

Figure 1 is a view of the device in top plan;

Figure 2 is a sectional view taken on the line 2—2 of Figure 1;

Figure 3 is a sectional view taken on the line 3—3 of Figure 1;

Figure 4 is a sectional view taken on the line 4—4 of Figure 1, and

Figure 5 is a sectional view taken on the line 5—5 of Figure 1.

Referring specifically to the drawing wherein like reference characters designate like or similar parts, the device has a substantially Y-shaped frame 10 consisting for example of arms 11 riveted at 12 to a bar 13. The arms 11 have bearing portions 14 deflected away from each other and which are provided with openings in which a reel 15 is journaled. Such reel is preferably part of a one piece rod having an arm 16 bent at a right angle thereto and from which a handle or operating crank 17 is bent.

The reel 15 is operatively positioned against accidental displacement by means of cotter keys or the like 18 and 19 passed removably therethrough between the bearings 14 and adjacent to the latter, to prevent undue lateral movement of the reel. Slipped over the end of the reel 15 and located between the cotter keys 18 and 19 are washers 20 and 21. The washer 20 rotates with the reel since it is fastened to the cotter key 18 by means of a rivet or the like 22 passed through the eye 23 of the cotter and through an opening in the washer 20. A portion 24 of the washer 20 is deflected and disposed in apposition to a hole 25 extending diametrically through the reel. The washer 21 is loose on the reel 15 and unconnected to the cotter 19.

In the use of the device, the bar 13 is connected as through the medium of an eye 26 at one end thereof, with a portion of a clothesline wire 27 while a portion 28 of the clothesline wire is extended into the opening or hole 25. The handle 17 is thereupon turned causing the wire portion 28 to coil about the reel, the coils being guided by the offset portion 24 of washer 20, causing them to surround the reel 15 and accumulate in a direction toward the washer 21. When the coils strike the washer 21 the latter has the effect of reversing the direction of winding thereof so that they will superpose on those coils in direct contact with the reel 15.

It will thus be seen that the device is connected in and remains a permanent part of a clothesline wire, although no limitation to such use is to be inferred.

The device provides a means whereby the wire may be tightened at any time simply by turning the crank 17. When the wire is taut, the handle or crank may be held against unwinding movement, through the engagement of a hook 29 with the portion 16, the hook being loosely pivoted as at 30 in an opening 31 of the bar 13.

Various changes may be resorted to provided they fall within the spirit and scope of the invention.

I claim as my invention:—

1. A device of the class described having a frame, a reel journaled in said frame and provided with a hole to receive the terminal of a wire or the like for tightening by coiling about the reel, a fastening element on the reel aiding in positioning the reel in the frame, a member disposed on the reel, a means securing said member to the fastening element for turning with the reel, and said member having an offset portion in apposition to said hole to serve as a wire-adjusting guide block.

2. A device of the class described having a frame, a reel journaled in said frame and provided with a hole to receive the terminal of a wire or the like for tightening by coiling about the reel, a fastening element on the reel aiding in positioning the reel in the frame, a member disposed on the reel, a means securing said member to the fastening element for turning with the reel, and said member having an offset portion in apposition to said hole to serve as a wire-adjusting guide block, said fastening element being a cotter key passing through the reel, and said member being a washer disposed on the reel, and the securing means being an element passing through the eye of the cotter and through the washer.

3. A device of the class described having a frame, a reel journaled in said frame and provided with a hole to receive the terminal of a wire or the like for tightening by coiling about the reel, a fastening element on the reel aiding in positioning the reel in the frame, a member disposed on the reel, a means securing said member to the fastening element for turning with the reel, and said member having an offset portion in apposition to said hole to serve as a wire-adjusting guide block, said fastening element being a cotter key passing through the reel, and said member being a washer disposed on the reel, and the securing means being an element passing through the eye of the cotter and through the washer, a cotter passing through the reel inwardly of the frame, a washer loose on the reel inwardly of said cotter.

4. A device of the class described having a frame, a reel journaled in said frame and provided with a hole to receive the terminal of a wire or the like for tightening by coiling about the reel, a fastening element on the reel aiding in positioning the reel in the frame, a member disposed on the reel, a means securing said member to the fastening element for turning with the reel, and said member having an offset portion in apposition to said hole to serve as a wire-adjusting guide block, said fastening element being a cotter key passing through the reel, and said member being a washer disposed on the reel, and the securing means being an element passing through the eye of the cotter and through the washer, and means on the reel within the frame for abutment by the wire coils and to cause formation thereof in the opposite direction.

5. A device of the class described having a frame, a reel journaled in said frame and provided with a hole to receive the terminal of a wire or the like for tightening by coiling about the reel, a fastening element on the reel aiding in positioning the reel in the frame, a member disposed on the reel, a means securing said member to the fastening element for turning with the reel, and said member having an offset portion in apposition to said hole to serve as a wire-adjusting guide block, said fastening element being a cotter key passing through the reel, and said member being a washer disposed on the reel, and the securing means being an element passing through the eye of the cotter and through the washer, and means on the reel within the frame for abutment by the wire coils and to cause formation thereof in the opposite direction, said frame having a bar provided with an opening for fastening of one portion of a wire thereto, a hook loosely connected to the bar and engageable with the reel to prevent unwinding movement of the latter, and arms connected to the bar having spaced portions forming bearings for said reel.

JACOB M. HAYNES.